United States Patent [19]

Kataoka et al.

[11] Patent Number: 5,754,215
[45] Date of Patent: May 19, 1998

[54] CONTROL CIRCUIT FOR POLYGON MIRROR MOTOR AND LASER BEAM PRINTING MACHINE USING THE SAME

[75] Inventors: Emika Kataoka; Noboru Takizawa, both of Kyoto, Japan

[73] Assignee: Rohm Co., Ltd., Kyoto, Japan

[21] Appl. No.: 337,362

[22] Filed: Nov. 8, 1994

[30] Foreign Application Priority Data

Nov. 11, 1993 [JP] Japan .................... 5-305814

[51] Int. Cl.⁶ .................. B41J 2/47; B41J 2/435; G11B 7/00; H04N 1/23
[52] U.S. Cl. .................. 347/235; 347/132; 347/250
[58] Field of Search ............... 347/132, 235, 347/248, 250, 116, 232, 261; 359/216, 217; 388/800, 812; 318/268, 561

[56] References Cited

U.S. PATENT DOCUMENTS 5,264,870 11/1993 Egawa ................. 347/248

5,381,165 1/1995 Lofthus et al. ............. 347/232

Primary Examiner—N. Le
Assistant Examiner—L. Anderson
Attorney, Agent, or Firm—Fay, Sharpe, Beall, Fagan, Minnich & McKee

[57] ABSTRACT

In the present invention, data with regard to passing time of respective sides of a polygon mirror when a polygon motor is in a predetermined rotating condition is stored in a memory at the respective addresses, the memory is accessed in response to the rotation of the polygon mirror and the data on the side (reflection face) performing the scan on a photo sensitive drum are successively generated while corelating with the scan, a difference between a target rotating amount under a proper standard rotation of a particular side and an actual rotating amount of the particular side is obtained time to time for respective sides of the polygon mirror, which depends on the processing accuracy of the respective sides, thereby even the polygon motor having a poor processing accuracy can be controlled at the standard rotation so that the scanning speed by the rotation is brought about to a target value like a polygon motor having a high processing accuracy.

6 Claims, 5 Drawing Sheets

CONTROL CIRCUIT FOR POLYGON MIRROR MOTOR AND LASER BEAM PRINTING MACHINE USING THE SAME

BACKGROUND OF THE INVENTION

1. Field of the Invention

The present invention relates to a control circuit for a polygon mirror motor (a motor for rotating a polygon mirror) and a laser beam printing machine using the same and, more specifically, relates to a polygon motor control circuit wherein, with regard to the polygon mirror motor ("polygon motor"), which is to be used in a laser beam scanning and plotting type printing machine such as a laser beam printer (LBP), plain paper copier (PPC), or laser facsimile machine, even when the production accuracy of the respective reflection faces of the polygon mirror is comparatively poor, the polygon motor can be used in the same manner as for a polygon motor that rotates a polygon mirror having reflecting faces produced with a high accuracy.

2. Description of Related Art

Figure 6:
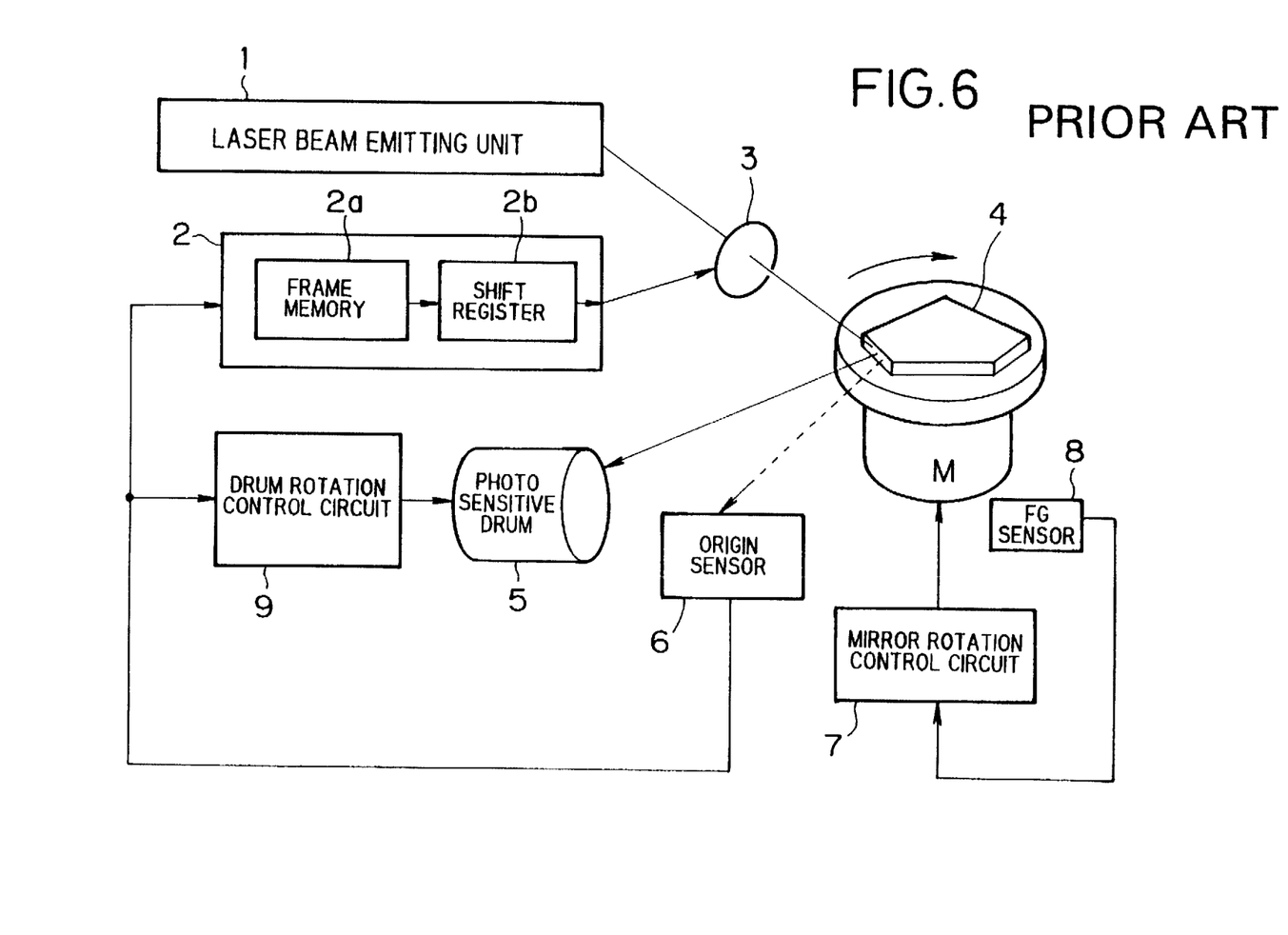
FIG. 6 is a block diagram of a major portion of a conventional laser beam printer.

A block diagram of a major portion of a conventional laser beam printer is shown in FIG. 6. In the laser beam printer, a laser beam outputted from a laser beam outputted from a laser beam emitting unit 1 is received on a rotatable polygon mirror 4, from which the laser beam is reflected toward a rotatable photo sensitive drum 5. Thereby, the surface of a photo sensitive medium on the photo sensitive drum 5 is scanned by the laser beam. The laser beam intensity at respective moments is varied through control of the transmittancy or ON/OFF of a liquid crystal shutter 3 in response to image information from an image processing circuit 2. As a result, the charged condition at the surface of the photo sensitive medium on the photo sensitive drum 5 is varied, and toner is adhered thereon according to the varied condition, which toner is transferred onto a printing paper with a density difference corresponding to the varied condition to complete a print image.

In FIG. 6, M represents a motor in which an FG sensor 8 (a sensor which generates a frequency signal corresponding to motor rotation) is provided, and the signal from the FG sensor 8 is to be received by a mirror rotation control circuit 7 to control the rotation of the motor M. Further, numeral 9 denotes a drum rotation control circuit which controls the rotation of the photo sensitive drum 5.

For the sake of convenience of explanation, FIG. 6 is illustrated in a block diagram form wherein the circuits are divided depending on their respective functions; however, in an actual control unit, the image processing circuit 2 and the drum rotation control circuit 9, as well as the mirror rotation control circuit 7, are already integrated into one microcomputer and are realized by many kinds of program controls.

The polygon motor is a special motor in which a sensor used for controlling the rotating speed and phase is provided and a mirror is secured thereto, and therefore is a comparatively expensive part. In particular, in this type of motor it is necessary that the respective reflection faces of the polygon mirror (in the present invention the length of the respective reflection faces is important, therefore hereinbelow the reflection faces are referred to as sides depending on necessity), namely the length of the respective sides of the polygon mirror, are equal, such that a high processing accuracy thereof is required. This is because, in order to bring about the rotation of the polygon motor into a constant target value, a difference between the target value and values obtained by actual rotation of the respective sides is calculated as an error and the polygon motor is controlled depending on the calculated error.

Therefore, the above control has a drawback in that, when the accuracy of the length equality of the respective sides is lowered, rotation control at a high accuracy cannot be achieved. When there exists a variation greater than a predetermined range with regard to the length of the respective sides, the polygon motor itself is determined to be defective. Therefore, when a particularly high accuracy is required for polygon motors, many of the polygon motors manufactured are determined to be defective, causing a problem of reduced yield.

SUMMARY OF THE INVENTION

An object of the present invention is to provide a control circuit for a polygon motor which permits an accurate rotation control even for a polygon motor mounting a polygon mirror having a comparatively low processing accuracy.

Another object of the present invention is to provide a non-expensive laser beam printing machine through use of a polygon motor mounting a polygon mirror having a comparatively low processing accuracy.

The features of the polygon motor control circuit and the laser beam printing machine using the same according to the present invention which achieve the above objects include a detector which receives a laser beam from a reflection face of a polygon mirror and detects either a scan initiating position of a scan object or said reflection face of the polygon mirror at a predetermined position; a counter which receives clock signals and counts the same; a register which stores the count value from the counter when the signal from the detector is received; a memory which stores data with regard to time period when the reflecting beams from the respective reflection faces of the polygon mirror are directed toward the side of the scan object when the motor for rotating the polygon mirror is under a predetermined rotating condition while correlating with the respective reflection faces into respective predetermined addresses; and a control circuit which reads out from the memory the data on the reflection face corresponding to the count value stored in the register, produces a PWM signal using a difference between the read-out data and the value stored in the register as an error, and drives the motor depending thereon.

Namely, the data with regard to the passing time of the respective sides of the polygon mirror when the polygon motor is in a predetermined rotation condition is stored in the memory at the respective addresses, the memory is accessed in response to the rotation of the polygon mirror and the data on the side (reflection face) performing the scan on a photo sensitive drum are successively generated while correlating with the scan, and any difference (error) between a target rotating amount under a proper standard rotation of a particular side and an actual rotating amount of the particular side is obtained time to time for respective sides of the polygon mirror, which depends on the processing accuracy of the respective sides.

The polygon motor is controlled depending on the error so that the rotation thereof reaches the target rotation number; therefore, even a polygon motor driving a mirror having a poor processing accuracy can be controlled at the proper standard rotation so that the scanning speed by the rotation is brought to a target value as for a polygon motor driving a mirror having a high processing accuracy.

DESCRIPTION OF THE PREFERRED EMBODIMENTS

Figure 1:
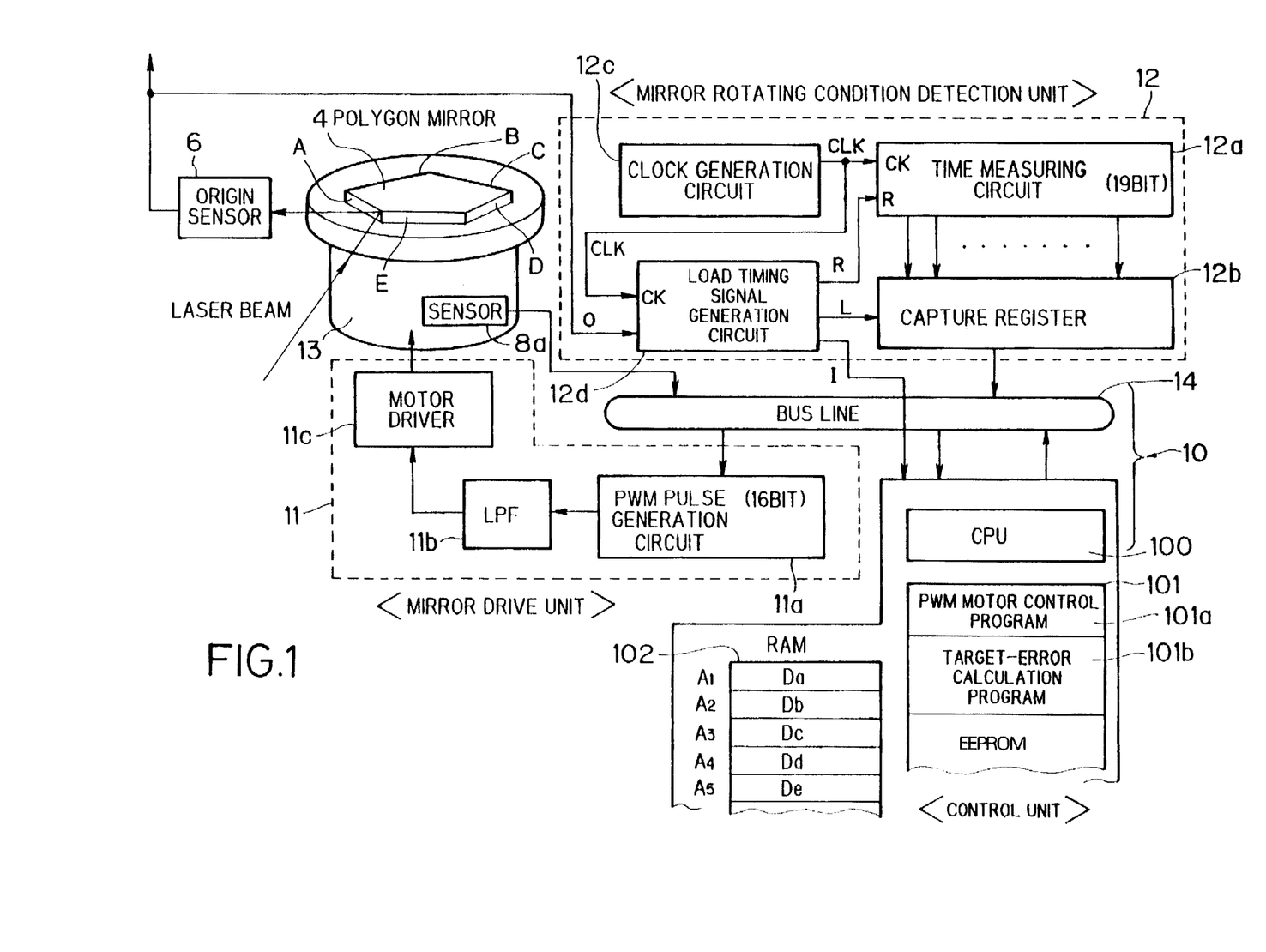
FIG. 1 is a block diagram depicting a motor control unit in one embodiment of a laser beam printer.

In FIG. 1, numeral 10 represents a control unit, which is composed of a bus 14, CPU 100, EEPROM 101, RAM 102 and the like, and which contains in a memory in the EEPROM 101 a PWM motor control program 101a and a target-error calculation program 101b for control programs. Further, in respective addresses A1, A2, A3, A4 and A5 in the RAM 102, data Da, Db, Dc, Dd and De, which represent time when respective reflection beams from respective sides A, B, C, D and E of the polygon mirror 4 (wherein the polygon mirror is assumed as a pentagonal mirror) are directed toward the photo sensitive drum 5 (in other words, the moving time of the laser beam passing through the photo sensitive drum 5 side under the proper standard rotating condition of the polygon mirror 13), are successively stored in the order of passing through the respective sides during rotation. Further, these data are transferred from the EEPROM 101 to the respective addresses A1, A2, A3, A4 and A5 in the RAM 102 at the initial setting after the power source is switched on.

These data Da, Db, Dc, Dd and De are determined by measuring time spans between the moments when the respective reflection beams from respective sides A, B, C, D and E of the polygon mirror 4 irradiate the origin sensor 6 and the moments when the reflection beam of the following side subsequently irradiates the origin sensor 6 under a rotating condition (the proper standard rotating condition) such that the scanning speed on the surface of the photo sensitive drum 5 through respective sides A, B, C, D and E reaches a predetermined constant value. The time spans can be measured via a measuring device while rotating the polygon mirror motor 13 and simulating scanning conditions, or alternatively can be measured after assembling entire elements and when the rotating condition of the polygon mirror motor reaches the standard condition. These measurement data are afterward stored in the ROM 101 and then transferred to the respective addresses A1, A2, A3, A4 and A5 in the RAM 102.

When the target-error calculation program 101b is executed by the CPU 100, the respective addresses A1, A2, A3, A4 and A5 are accessed in sequence for the corresponding sides A, B, C, D and E which receive laser beams in response to rotation of the polygon mirror 4. Namely, through the execution of the program, in response to rotation of the respective sides and at the position of the origin where the scanning of the subsequent side is initiated, the data corresponding to the immediately previous side among the data Da, Db, Dc, Dd and De is referred to, and any difference between the referenced data and the value in the capture register 12b is calculated as an error. This program is a simple one which primarily performs the mere reference to data and calculation of a difference such that further explanation of the content is omitted. Further, the target-error calculation program 101b causes the CPU 100 to execute the PWM motor control program 101a after storing the calculated error in the RAM 102.

PWM motor control program 101a is one in which the above calculated error value is substituted into a predetermined function and a data with regard to pulse width which nulls the error is calculated. For example, a pulse data which eliminates error is produced and outputted, which pulse data is determined by subtracting a reference pulse width from the date having the above error component or of a value determined by multiplying a predetermined coefficient by the error component. Further, this type of program is already known in PWM control technology.

In FIG. 1, the same constitutional elements as in FIG. 6 are denoted by the same reference numerals, therefore the explanation thereof is omitted. In the present embodiment, the portion corresponding to the mirror rotation control circuit 7 in FIG. 6 is constituted by a mirror driving unit 11 and a mirror rotating condition detection unit 12 as well as the control unit 10. Further, in place of the FG sensor 8 illustrated in FIG. 6, a sensor 8a which is designed to detect arrival via rotation of a predetermined side is provided. In the present embodiment the sensor 8a is a sensor for detecting the side A which detects arrival of the side A to a predetermined position. The detection signal is sent to the CPU 100 via the bus 14 as an interrupt signal.

When the CPU 100 receives the detection signal from the sensor 8a, the CPU 100 sets a value of an address counter (not shown) representing an address for accessing the RAM 102 at A1 corresponding to the side A.

The mirror driving unit 11 is constituted by a PWM pulse generation circuit 11a, a low pass filter (LPF) 11b and a motor driver 11c,and the PWM pulse generation circuit 11a is connected to the control unit 10 via the bus 14. Herein, "PWM" implies the so called pulse width modulation and the PWM pulse generation circuit 11a is a circuit in which bit data is converted into a pulse width, and a pulse having the pulse width corresponding to the data value is generated.

The mirror rotating condition detection unit 12 is constituted by a time measuring circuit 12a, a capture register 12b, a clock generation circuit 12c and a load timing signal generation circuit 12d, and the capture register 12b is connected to the control unit 10 via the bus 14.

The time measuring circuit 12a is a free running counter of 19 bits which receives clock pulses CLK from the clock generation circuit 12c, and the count value thereof represents a time value from a count initiation moment. Further, circuits other than the LPF 11b, the time measuring circuit 12a and the clock generation circuit 12c are constituted as internal circuits of a microcomputer and the above excluded circuits are provided as externally added parts for the microcomputer.

Numeral 13 represents a polygon motor incorporating the sensor 8a therein, is driven by the motor driver 11c in the mirror driving unit 11 and rotates the polygon mirror 4. The load timing signal generation circuit 12d receives the clock pulses CLK, for example, of a frequency of 50 MHz from the clock generation circuit 12c, and further generates a reset pulse R, a load pulse L and an interrupt signal I when an origin pulse O is received from the origin sensor 6. The reset pulse R resets the count value of the time measuring circuit 12a, the load pulse L is added to the capture register 12b whereby the capture register 12b captures the count value of the time measuring circuit 12a, and the interrupt signal I constitutes an interrupt signal to the CPU 100 in the control unit 10. In response to the interrupt the CPU 100 executes the target-error calculation program 101b.

Figure 2:
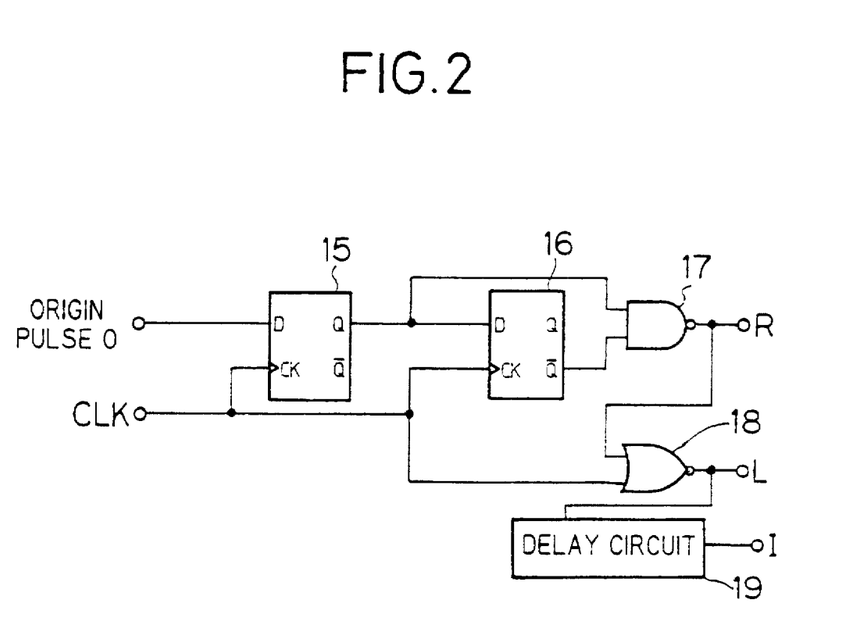
FIG. 2 is a block diagram of a load timing signal generation circuit in the motor control circuit as shown in FIG. 1.

The load timing signal generation circuit 12d generates pulses of the load pulse L and reset pulse R in this order in response to generation of one origin pulse O. FIG. 2 is a detailed circuit diagram of the load timing signal generation circuit 12d which is constituted by two D latch flip-flop circuits 15 and 16, a NAND gate 17, a NOR gate 18 and a delay circuit 19.

The operation thereof is explained with reference to FIG. 3. When an origin pulse O is generated ((a) in FIG. 3), the origin pulse O is inputted to the data input of the D latch flip-flop circuit 15, and the input is held at the leading edge timing of a clock pulse CLK ((b) in FIG. 3) to generate an output (HIGH level) at Q. The Q output is applied to the data input of the flip-flop circuit 16 in the subsequent stage as well as applied to the NAND gate 17. Thereby, the NAND gate 17 is rendered LOW ((c) in FIG. 3). When the subsequent clock pulse CLK is applied to the flip-flop circuit 16 in the subsequent stage, at the timing of the leading edge of the clock pulse the data is set in the flip-flop circuit 16, and the output at Q is dropped (is rendered LOW).

Figure 3:
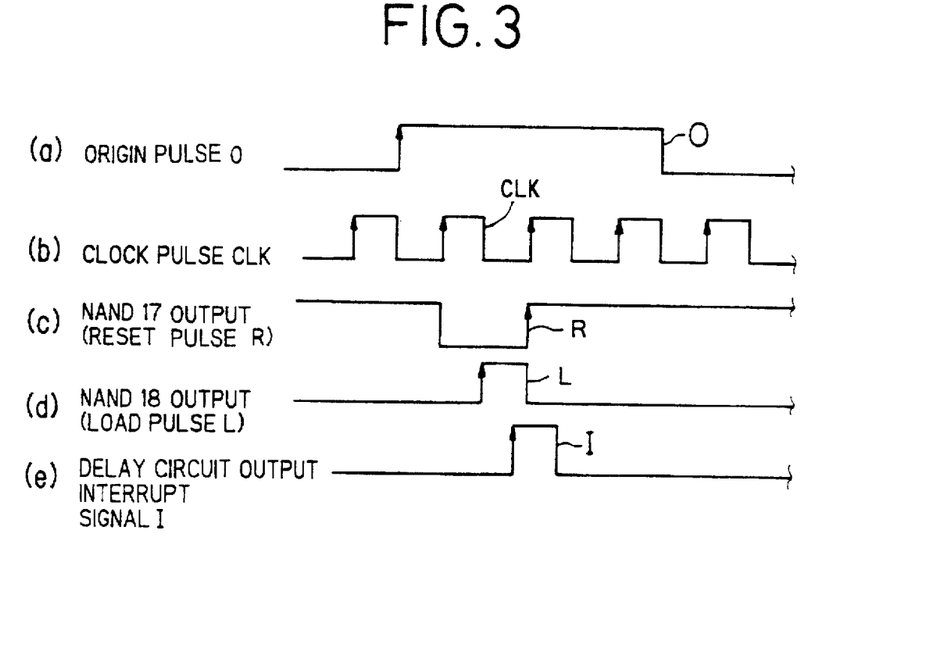
FIG. 3 is a timing diagram for explaining the operation of the load timing signal generation circuit as shown in FIG. 2.

Since the ¯Q output of the flip-flop circuit 16 is applied to the NAND gate 17, as a result, a reset pulse having a waveform indicated by R ((c) in FIG. 3) is generated at the NAND gate 17. The time measuring circuit 12a is reset at the leading edge timing of the reset pulse R. On one hand, the NOR gate 18 generates a load pulse L ((d) in FIG. 3) when a reset pulse R (LOW level) and trailing edge of a clock pulse CLK are received. The capture register 12b fetches the count value of the time measuring circuit 12a at the leading edge timing of the load pulse L. Further, the interrupt signal I is generated from the delay circuit 19 at a timing slightly delayed from the load pulse L ((e) in FIG. 3, and is sent out to the CPU 100 in the control unit 10. Namely, in the present load timing signal generation circuit 12d, the load pulse L is generated prior to the reset signal R so that the capture register 12b captures the count value of the time measuring circuit 12a. Thereafter, the value of the time measuring circuit 12a is reset by the trailing edge of the reset signal at the timing of the subsequent clock pulse.

Figure 4:
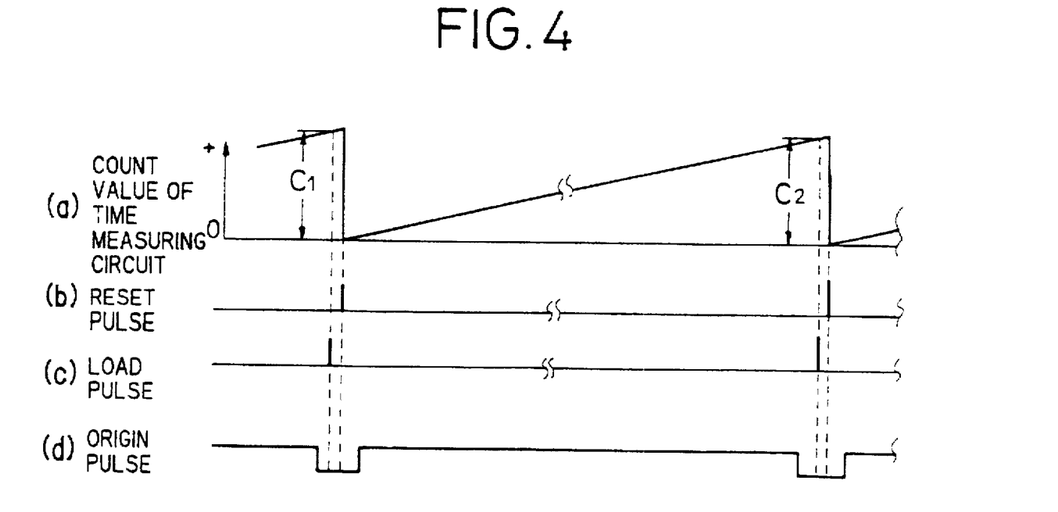
FIG. 4 is a timing diagram for explaining a time measurement operation in the motor control circuit as shown in FIG. 1.

Now, general control operation of the present embodiment is explained. When the load timing signal generation circuit 12d receives an origin pulse O from the origin sensor 7, the load timing signal gerneration circuit 12d generates at first the load pulse L at the timing as explained in connection with FIG. 3 and thereafter generates the reset pulse R, which is repeated every time when an origin pulse O is inputted. The load pulse L and reset pulse R are generated alternatively in this order. Although the control is started by an interrupt signal I generated in response to a load pulse L generated at the very first time, when neglecting this very first load pulse L, it will be assumed that after a reset pulse R which is generated by a certain origin pulse O, a load pulse L is generated in response to a subsequent origin pulse O as illustrated in FIG. 4 ((b) and (c) in FIG. 4). The value of the time measuring circuit 12a is rendered "0" by the preceding reset pulse R and the time measuring circuit 12a starts a time measuring operation according to a clock pulse CLK. Then, in response to generation of the subsequent origin pulse O ((d) in FIG. 4) the measured time value of the time measuring circuit 12a is fetched by the capture register 12b which has received a load pulse L from the load timing signal generation circuit 12d. The measured time value represents a count value (C1 in (a) in FIG. 4) at the moment, namely, the passing time of a laser beam reflected by a certain side over the side of the photo sensitive drum 5. After the generation of the load pulse L, the value of the time measuring circuit 12a is reset by the reset pulse R generated in response to the above mentioned origin pulse O and the time measuring circuit 12a restarts the counting operation of clock pulses CLK (C1, C2 in (a) in FIG. 4).

Figure 5:
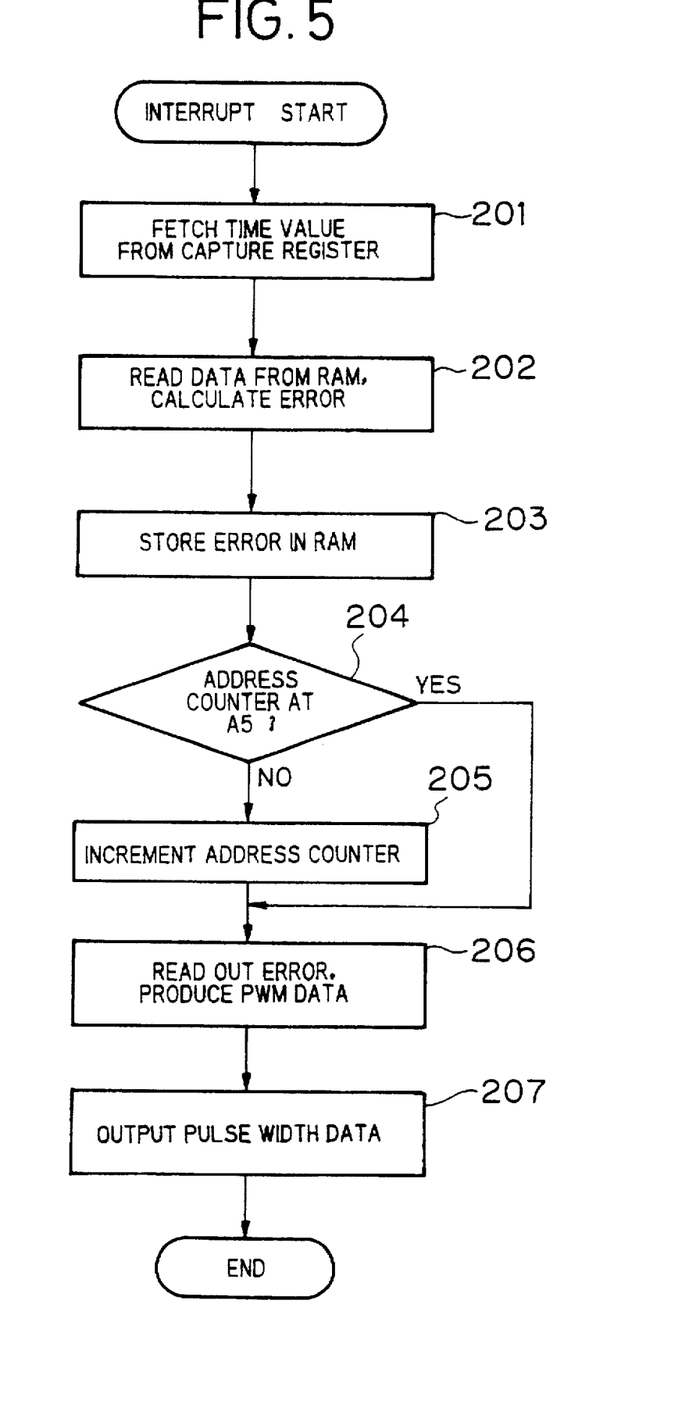
FIG. 5 is a flow chart of a general processing of a PWM control in the control unit as shown in FIG. 1.

Now, the PWM control in the control unit 10 is explained with reference to the flowchart as illustrated in FIG. 5. For example, in response to an origin pulse O which is generated after passing the side A of the polygon mirror 4 and starting the scanning operation by the side B, an interrupt signal I is generated following a load pulse L. At this moment, through another interrupt processing program, the CPU 100 has received a detection signal from the sensor 8a indicating the passing of the side A, and in response to the detection signal sets an address counter for accessing the RAM 102 in the address A1 corresponding to the side A. Further, the capture register 12b fetches the time value (C1, C2, ... in (a) in FIG. 4) from the tie measuring circuit 12a in response to generation of the load pulse L.

On one hand, in response to the generation of the interrupt signal I, the CPU 100 at first executes the target-error calculation program 101b wherein the above mentioned time value from the capture register 12b (step 201) is fetched, data Da among data Da, Db, Dc, Dd and De is fetched by accessing address A1 in the RAM 102 and an error from the fetched data is calculated (step 202). The calculated error is stored in the RAM 102 (step 203) and it is judged whether the value of the address counter is A5 (step 204). When the judgment is "NO", the address of the program counter (not shown) is incremented to address A2 (step 205). When the judgment is "YES", the process jumps over the step 205 and moves to step 206. Then, PWM motor control program 101a is executed wherein the stored error data is read out from the RAM 102 and a PWM data depending on the error amount is produced which nulls the error (step 206). The produced PWM data is outputted in a form of a predetermined pulse width data to the PWM pulse generation circuit 11a.

As a result, a bit data representing the pulse width which controls the rotation of the polygon motor 13 in the direction for eliminating the error depending on the amount of error is sent out to the PWM pulse generation circuit 11a. The PWM pulse generation circuit 11a generates a pulse having a pulse width corresponding to the received bit data which is applied to the LPF 11b, wherein the pulse is wave-shaped into a drive wave form and sent out to the motor driver 11c The above operation is performed in response to respective interrupt signals I which are successively generated in response to rotation of the respective sides A, B, C, D and E of the polygon mirror 4 and when the value of the program counter reaches A5, the value is subsequently returned to A1 and the addresses A1, A2, A3, A4 and A5 are successively accessed in circulation. Thus, the resultant data Da, Db, Dc, Dd and De are successively generated in circulation after the laser beam reflected by the respective sides A, B, C, D and E has passed over the side of the photo sensitive drum 5, and errors between the generated data and the actual passing times of the sides A, B, C, D and E are calculated for respective sides. Then, PWM data which eliminate the errors are produced depending on the amount of errors via the PWM motor control program 101a every time the respective sides pass, and are outputted to the PWM pulse generation circuit 11a.

Thereby, the rotation of the polygon motor 13 is controlled depending on the deviation amount of the errors so that the rotation coincides with the standard rotation in which the data Da, Db, Dc, Dd and De were measured. Further, since the rotation is controlled with reference to the origin sensor 6 as explained above, the rotating phase is also matched to the detection timing of the origin sensor 6. Still further, since the origin sensor 6 is located at the reference position for scanning of the photo sensitive drum 5, the scanning phase over the photo sensitive drum 5 is also synchronized thereby.

Now, general operation of the laser beam printer is explained with reference to FIG. 6 and FIG. 1. When the power source is switched on through control of the control unit 10 which detects a low rotating condition of the polygon mirror 4, the rotation of the polygon mirror 4 is accelerated. When the rotating speed of the polygon mirror 4 reaches a speed in which the laser beam scans a distance corresponding to one dot in an image, for example, in a time of 100 ns, thereafter the above explained control is performed so as to maintain the rotating speed which meets the proper standard rotation speed according to the data Da, Db, Dc, Dd and De.

Through the above operation, when the rotating condition of the polygon mirror 4 reaches steady state, the preparation of the optical system is completed and the laser beam printer is placed in a condition allowing printing. When the image processing circuit 2 receives printing data from a host computer (not shown), the image processing circuit 2 adds, for example, printing frame data which are stored in advance, to the received printing data to produce image information data for one page composed of a dot pattern, and stores the same in the frame memory 2a. Data for the first line among the stored image information data are parallel-loaded in the shift register 2b, to await an origin pulse O from the origin sensor 6. When the origin pulse 0 is received, the image processing circuit 2 outputs the image information data in synchronism with the origin pulse O.

The above output is sent out to the liquid crystal shutter 3 and the transmittancy of the liquid crystal shutter 3 is varied depending on the output, such that the intensity of the laser beam which scans over the photo sensitive drum 5 is varied depending on the dot pattern data of the image information from the image processing circuit 2. Thereby, the plotting for one line is performed over the photo sensitive drum 5. In this way, when one scanning operation by the laser beam is completed, the photo sensitive drum 5 rotates by an amount corresponding to one dot in the vertical direction and a similar processing is repeated.

In the above explained embodiment, the rotation errors corresponding to the lengths of the respective sides are calculated via the target-error calculation program 101b. However, in place of the processing via the program, such processing can be performed by a hardware circuit provided with a subtraction circuit or a comparison circuit, and a program counter which designates a memory and address, wherein through incrementing the program counter the value thereof is circulated, and thereby the error calculation is performed at a high speed.

Further, in the disclosed embodiment, the data Da, Db, Dc, Dd and De are stored in an order in the respective addresses in association with the rotation; however, it is enough if data corresponding to the respective sides are obtained, such that it is not necessary for the data to be stored in any particular order.

We claim:

1. A control circuit for a rotatable polygon mirror motor, comprising:

an origin sensor which receives a laser beam from one of a plurality of reflection faces of a rotatable polygon mirror, said one reflecting face reflecting said laser beam toward a scan object; and which generates an origin signal in response to receipt of said laser beam;

a detection unit which receives said origin signal, said detection unit including:

a clock generator;

a counter which receives and counts clock signals from said clock generator in response to said receipt of said origin signal; and a register which receives and stores a count value from said counter in response to said receipt of said origin signal;

a memory which stores, in predetermined addresses respectively corresponding to the reflection faces, scan time data, wherein the scan time data represents a time period required for a laser beam to scan each of the reflection faces of said rotatable polygon mirror when said rotatable polygon mirror is under a predetermined rotating condition; and a control unit which reads out data from said memory on the reflection face that corresponds to the count value stored in said register for each origin signal generated by said origin sensor, produces a PWM signal using a difference between the read-out data and the count value stored in said register, and drives the rotatable polygon mirror motor depending thereon.

2. A control circuit for a rotatable polygon mirror motor according to claim 1, wherein:

said scan object is a photo sensitive drum, said counter measures respective times during which beams scan and are reflected from the respective reflection faces of said rotatable polygon mirror toward said photo sensitive drum in response to the clock signals and said origin signal, the predetermined rotating condition occurs when a scanning speed of the laser beam reflected from the respective reflection faces over said photo sensitive drum substantially reaches a predetermined constant value, and said control unit accesses the predetermined addresses in said memory in reflection face sequence while correlating the respective addresses in said memory to the respective reflection faces of said rotatable polygon mirror.

3. A control circuit for a rotatable polygon mirror motor according to claim 2, further comprising a sensor which detects arrival of a predetermined reflection face of said rotatable polygon mirror and issues a sensor interrupt signal in response thereto, wherein said memory successively stores the data in the respective addresses in association with order of reflection faces scanned through rotation of the rotatable polygon mirror, renews the address to a next subsequent address every time after the origin signal is received by said detection unit, and changes the address to the address containing the data corresponding to the predetermined reflection face when the sensor interrupt signal is received from said sensor.

4. A control circuit for a rotatable polygon mirror motor according to claim 3, wherein said control unit includes a microprocessor;

wherein said detection unit further includes a timing signal generation circuit which receives the clock signals from said clock generator and the origin signal from said origin sensor and, upon receipt of the clock signals and origin signal, successively generates and outputs a load signal to the register, an operation initiating signal to said microprocessor, and a reset signal to the counter, in this order, and wherein said register stores the count value of said counter in response to the load signal received from said timing signal generation circuit, the processing of said control unit is executed via said microprocessor in response to the operation initiating signal, and said counter is reset in response to the reset signal.

5. A laser beam printing machine, comprising:

a polygon mirror having a plurality of reflection faces, of which one reflection face reflects a laser beam for scanning a scanning object;

a mirror motor for rotating said polygon mirror;

an origin detector which is disposed so as to receive the laser beam at a position that corresponds to an origin position for scanning the scanning object by the laser beam, and which generates an origin pulse upon receipt of the laser beam;

an image processing circuit which holds image information of a printing object, converts the image information into a data format suitable for the scanning by the laser beam, and outputs, in synchronism with the origin pulse, the formatted image information;

a timing signal generation circuit which, upon receipt of the origin pulse from said origin detector, generates a load signal and a reset signal in this order;

a counter which receives the reset signal from the timing signal generation circuit and is reset in response thereto, and further receives clock signals from a clock generator and counts the clock signals between successive reset signals;

a register which, upon receipt of the load signal after said counter is reset, stores a count value of said counter;

a memory which stores, in predetermined addresses respectively corresponding to the reflection faces, scan time data, wherein the scan time data represents to a time period required for a laser beam to scan said one reflection face of said polygon mirror when said mirror is under a predetermined rotating condition; and a control unit which reads out data from said memory on the reflection face that corresponds to the count value stored in said register for each origin signal generated by said origin detector, produces a PWM signal using a difference between the read-out data and the value stored in said register, and drives said rotatable polygon mirror motor depending thereon, wherein said scanning object is a photo sensitive drum, wherein the predetermined rotating condition occurs when a scanning speed of the laser beam reflected from the respective reflection faces over said photo sensitive drum substantially reaches a predetermined constant value, and wherein said control unit accesses the predetermined addresses in said memory in reflection face sequence while correlating the respective addresses in said memory to the respective reflection faces of said polygon mirror.

6. A laser beam printing machine according to claim 5, further comprising a sensor which detects arrival of a predetermined reflection face of said polygon mirror through rotation of said polygon mirror and issues a sensor interrupt signal in response thereto, wherein said memory successively stores the data in the respective addresses in association with order of rotation of said respective reflection faces, renews the address to a next subsequent address every time after the origin signal is generated by said origin detector, and changes the address to the address containing the data corresponding to the predetermined reflection face when the sensor interrupt signal from said sensor is received.

* * * * *